United States Patent
Van Denend et al.

[11] Patent Number: 5,974,972
[45] Date of Patent: Nov. 2, 1999

[54] PRINTING CARRIER SLEEVES AND METHOD FOR MANUFACTURING THE SAME

[76] Inventors: Mark E. Van Denend, 349 E. 36th St., Paterson, N.J. 07504; Jerome T. Mussman, 6250 Ashbourne Pl., Cincinnati, Ohio 45233; John R. Perazzo, 3805 Sherbrooke Dr., Cincinnati, Ohio 45241

[21] Appl. No.: 09/055,493

[22] Filed: Apr. 6, 1998

[51] Int. Cl.$^6$ .................................................. B41F 30/00
[52] U.S. Cl. ...................... 101/375; 101/389.1; 492/57; 29/895.23
[58] Field of Search ..................... 101/217, 375, 101/376, 389.1, 401.1; 492/16–18, 48, 49, 51, 52, 57, 59; 29/895.2, 895.21, 895.23, 895.33

[56] References Cited

U.S. PATENT DOCUMENTS

| | | | |
|---|---|---|---|
| 3,146,709 | 9/1964 | Bass et al. | 101/375 |
| 3,978,254 | 8/1976 | Hoexter et al. | 101/375 |
| 3,997,645 | 12/1976 | Dempster | 101/389.1 |
| 4,178,664 | 12/1979 | McLoughlin | 492/56 |
| 4,378,622 | 4/1983 | Pinkston et al. | 101/376 |
| 4,391,898 | 7/1983 | Van Der Velden | 101/368 |
| 5,031,297 | 7/1991 | Nelson | 29/895.212 |
| 5,216,954 | 6/1993 | Thompson | 101/375 |
| 5,256,459 | 10/1993 | Carlson | 101/375 |
| 5,289,769 | 3/1994 | Lewis | 101/218 |
| 5,316,798 | 5/1994 | Tittgemeyer | 492/48 |
| 5,324,248 | 6/1994 | Quigley | 492/50 |
| 5,351,615 | 10/1994 | Kobler et al. | 101/376 |
| 5,351,616 | 10/1994 | Gelinas et al. | 101/218 |
| 5,352,507 | 10/1994 | Bresson et al. | 428/909 |
| 5,379,693 | 1/1995 | Hoffmann et al. | 101/375 |
| 5,415,612 | 5/1995 | Carlson et al. | 492/56 |
| 5,425,693 | 6/1995 | Gardner et al. | 493/301 |
| 5,492,059 | 2/1996 | Reichel | 101/375 |
| 5,497,549 | 3/1996 | Rademacher | 29/895.21 |
| 5,520,600 | 5/1996 | Fukumoto | 492/56 |
| 5,544,584 | 8/1996 | Thompson et al. | 101/401.1 |

FOREIGN PATENT DOCUMENTS

| | | | |
|---|---|---|---|
| 95954 | 12/1983 | European Pat. Off. | 101/389.1 |

*Primary Examiner*—Stephen R. Funk
*Attorney, Agent, or Firm*—Richard M. Goldberg

[57] ABSTRACT

A printing carrier sleeve for mounting printing plates thereon, is formed by cutting a sheet of flexible plastic material having opposite edges into a substantially rectangular shape of desired dimensions such that opposite edges are cut-away to provide complementary tabs and openings that interlock with each other, adhering printing plates on the sheet when the sheet is in a substantially flat condition, securing opposite edges of the sheet together in abutting relation so as to prevent air from passing between the opposite edges, and thereby forming the printing carrier sleeve in a cylindrical configuration, by placing a strip of tape on a forming cylinder, securing one edge of the rectangular sheet on the strip of tape on the cylinder, and wrapping the opposite edge of the sheet about the cylinder into abutting relation with the one edge to provide the interlocking arrangement.

20 Claims, 9 Drawing Sheets

FIG. 12

PRINTING CARRIER SLEEVES AND METHOD FOR MANUFACTURING THE SAME

BACKGROUND OF THE INVENTION

This invention relates generally to printing carrier sleeves removably mountable on flexographic printing cylinders and having printing plates mounted thereon, and more particularly, to a novel printing carrier sleeve that is simply constructed and easily formed.

In the flexographic printing process, flexible printing plates formed of rubber or other elastomeric material are permanently mounted on a printing carrier sleeve. The printing carrier sleeve is then mounted on a printing cylinder for use in a printing operation. Specifically, the printing plates are then inked in order to print on paper or film sheets.

However, because of the permanent mounting of the printing plates, in order to perform a different printing job, the carrier sleeves with the printing plates mounted thereon must be replaced with a different carrier sleeve and printing plates. Therefore, it is required that there be as many carrier sleeves as there are jobs to run.

This, of course, increases the operating expenses since multiple carrier sleeves must be manufactured and stored. Further, since the carrier sleeves are stored in their cylindrical shape, the amount of storage space that is required is great.

Some carrier sleeves are manufactured by helically winding a paper or other tape on a mandrel, such that the wound edges are in abutting relation, and then securing the edges together to form the carrier sleeve. As described in U.S. Pat. No. 3,978,254 to Hoexter et al, it is known to form carrier sleeves from a rectangular sheet of film material whose opposite edges are adjoined to define an inner tube. Then, a strip of plastic tape having an adhesive layer thereon is helically wound about the inner tube to define a first helix thereabout. Thereafter, a second strip of plastic tape having an adhesive layer thereon is wound in the opposite direction about the first helix.

Hoexter et al eliminates the inner tube, and merely forms the helically wound tape structure on a forming mandrel. See also U.S. Pat. No. 5,425,693 to Gardner et al. This is now a conventional manner of forming carrier sleeves.

However, these latter carrier sleeves suffer from several disadvantages. First, a different tooling must be provided for each diameter carrier sleeve. This greatly increases the cost of manufacture. Second, because of the formation only from oppositely wound helically wound tapes, so that there are different layers that form the carrier sleeve, the carrier sleeve tends to de-laminate, that is, the layers tend to separate. Third, because of the helically wound tapes, there are seams between adjacent winds of the tape. These seams can affect a high grade printing operation.

OBJECTS AND SUMMARY OF THE INVENTION

Accordingly, it is an object of the present invention to provide a carrier sleeve that avoids the aforementioned problems with the prior art.

It is another object of the present invention to provide a carrier sleeve made of a single layer, thereby overcoming the problem of de-lamination.

It is still another object of the present invention to provide a carrier sleeve with a single seam.

It is yet another object of the present invention to provide a carrier sleeve that does not require different tooling for different length or diameter carrier sleeves.

It is a further object of the present invention to provide a method of forming the aforementioned carrier sleeve that substantially reduces the time to form the carrier sleeve.

It is a still further object of the present invention to provide a method of forming the aforementioned carrier sleeve that permits disassembly and assembly of the sleeve while keeping the register position of the printing plates.

It is a yet further object of the present invention to provide a method of forming the aforementioned carrier sleeve that is much less expensive than the prior art.

In accordance with an aspect of the present invention, a printing carrier sleeve for mounting at least one printing plate thereon, includes a sheet of flexible material having opposite edges, with the opposite edges being provided in abutting arrangement with each other so as to form a cylinder having an outer surface for holding at least one printing plate thereon, the opposite edges being secured together. Preferably, the flexible material is a polyester material.

The opposite edges are cut-away to provide complementary tabs and openings that interlock with each other. In one embodiment, the complementary tabs and openings each have a substantially trapezoidal shape. In another embodiment, the complementary tabs and openings each have a substantially T-shape.

At least one piece of tape is provided for securing together the opposite edges. The tape is secured to an inner surface of the printing carrier sleeve.

In accordance with another aspect of the present invention, a method of forming a printing carrier sleeve for mounting at least one printing plate thereon, includes the steps of cutting a sheet of flexible plastic material having opposite edges into a substantially rectangular shape of desired dimensions, securing opposite edges of the sheet together in abutting relation to form the printing carrier sleeve in a cylindrical configuration, and mounting at least one printing plate on the sheet either prior to the step of securing when said sheet is in a substantially flat condition, or after the step of securing when the sheet is in a cylindrical configuration.

The step of cutting includes the step of cutting the sheet from a larger sheet by a laser cutting device or a punching operation.

Further, opposite edges of the sheet are secured together in abutting relation by securing one edge of the cut sheet on a forming cylinder, wrapping the opposite edge of the sheet about the forming cylinder into abutting relation with the one edge, and securing the one edge and the opposite edge together.

In one embodiment, a strip of tape is placed on the forming cylinder prior to the step of securing the one edge, then the one edge is secured on the strip of tape on the forming cylinder, and then the opposite edge of the sheet is wrapped about the forming cylinder into abutting relation with the one edge and secured on the strip of tape in the abutting relation. Preferably, the strip of tape is removably secured on the forming cylinder with a vacuum.

In accordance with another embodiment, the one edge is secured on the forming cylinder by applying a vacuum through openings in the forming cylinder to hold the one edge on the forming cylinder, the opposite edge of the sheet is wrapped about the forming cylinder into abutting relation with the one edge such that the opposite edge is held on the forming cylinder by the vacuum applied through the holes, and the one edge and the opposite edge are secured together by placing a strip of tape on an outer surface of the abutted edges. Thereafter, the formed printing carrier sleeve is removed from the forming cylinder, a further strip of tape is removably secured on the forming cylinder with the vacuum, with the adhesive side facing up, the formed printing carrier sleeve is positioned over the cylinder and in spaced relation to the cylinder, the abutting edges of the formed carrier sleeve are positioned onto the further strip of tape, and the formed carrier sleeve is removed with tape on an inside and outside thereof.

Preferably, the step of cutting cuts away the opposite edges of the sheet to provide complementary tabs and openings that can interlock with each other, and the opposite edges of the sheet are secured together by interlocking the tabs and openings of the opposite edges.

In accordance with still another embodiment of the present invention, apparatus for forming a printing carrier sleeve for mounting at least one printing plate thereon, includes a hollow forming cylinder having a plurality of small holes therein along an axial section of the forming cylinder, and a device for applying a vacuum to an interior of the hollow forming cylinder. A stand supports one end of the hollow forming cylinder in a cantilever manner, and the opposite end of the hollow forming cylinder is closed. The device for applying a vacuum includes a hose extending through the stand and into communication with an interior of the hollow forming cylinder, the hose being connected with a source of vacuum.

The forming cylinder includes at least one finger therein that is movable between a radially inward position to enable the carrier sleeve to lie on an outer surface of the forming cylinder, and a radially outward position to maintain the carrier sleeve in radially spaced relation from the outer surface of the forming cylinder. Preferably, the forming cylinder includes at least one lengthwise extending channel therein, and the at least one finger is pivotally mounted in the at least one lengthwise extending channel to be movable between the radially inward position and the radially outward position.

The above and other objects, features and advantages of the invention will become readily apparent from the following detailed description thereof which is to be read in connection with the accompanying drawings.

DETAILED DESCRIPTION OF THE PREFERRED EMBODIMENTS

Figure 1:
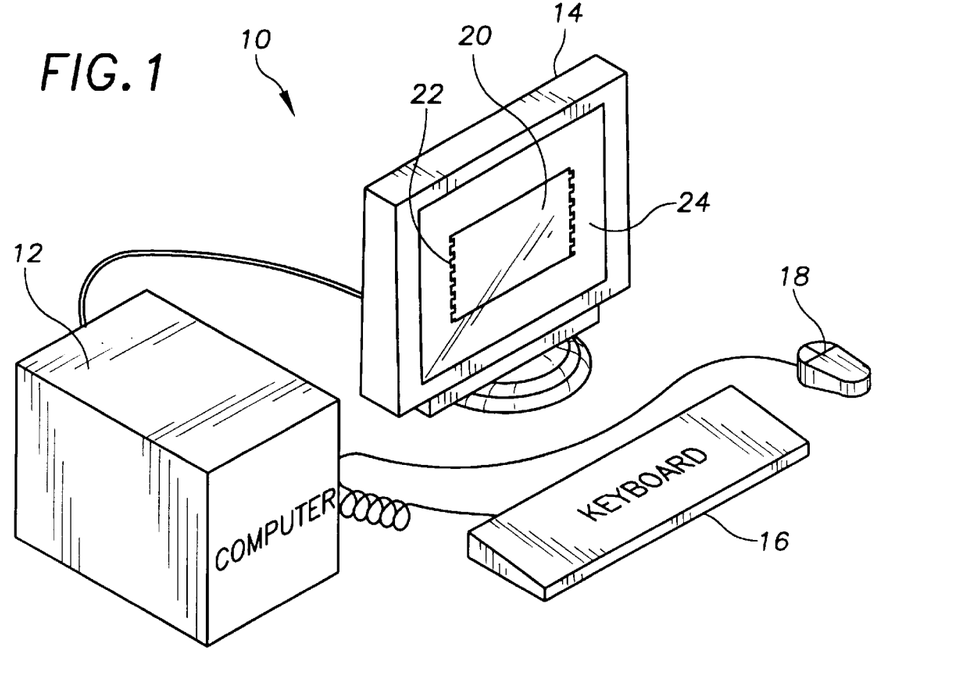
FIG. 1 is a perspective view of a computer system for creating the particular design and measurements of a rectangular sheet for forming a carrier sleeve according to one embodiment of the present invention.

Referring to the drawings in detail, and initially to FIG. 1, there is shown a computer system 10 including a computer 12 have a microprocessor, random access memory (RAM) as a work area and for holding working software programs, and a read only memory (ROM) for holding information on the operating system itself. A monitor 14, keyboard 16 and mouse 18 are connected with the microprocessor of computer 12.

Figure 10:
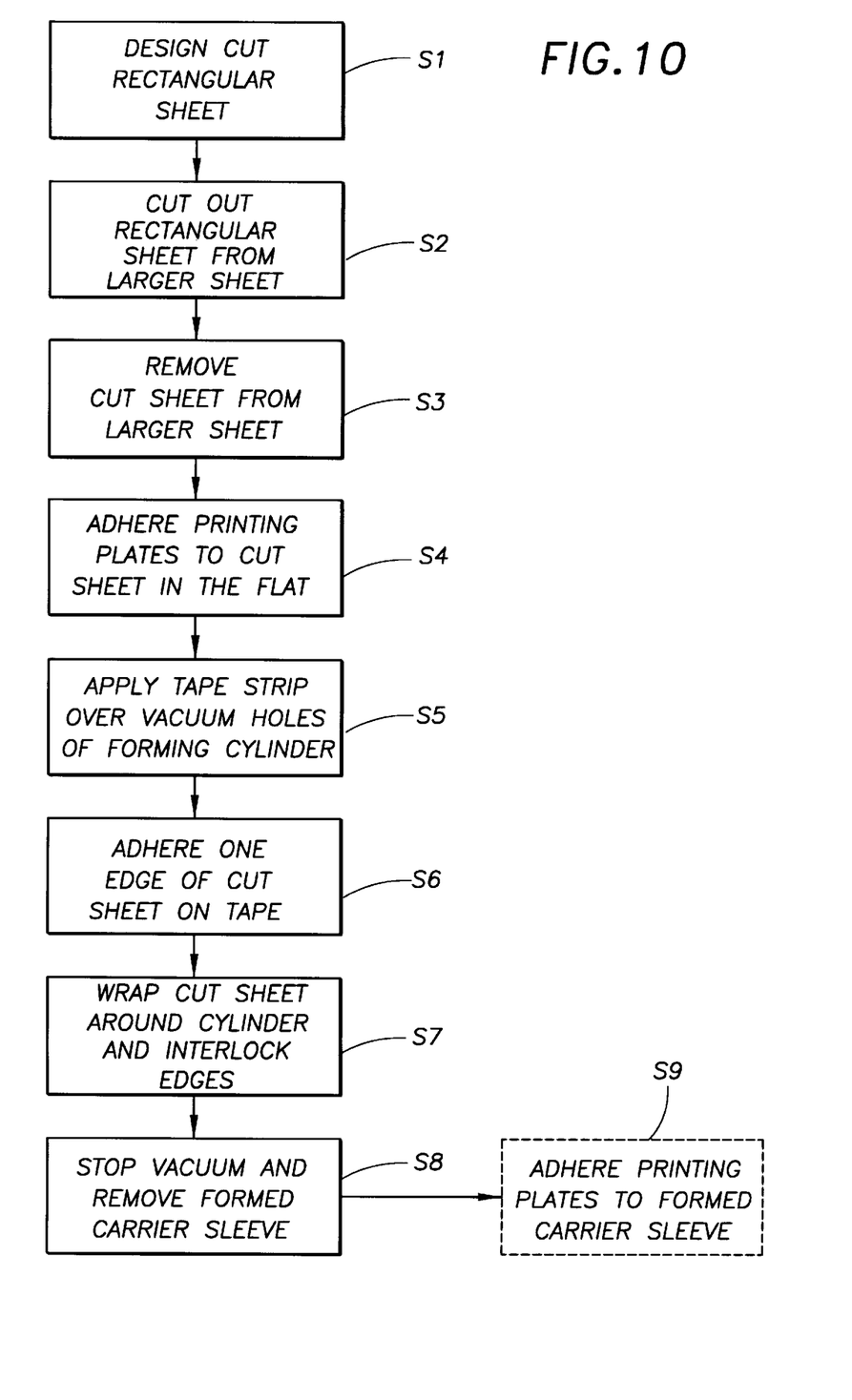
FIG. 10 is a flow chart diagram of one method of forming the carrier sleeve of the present invention.

By means of conventional software programs, such as conventional CAD programs, the design of a rectangular sheet design 20 and the dimensions thereof can be produced, as shown on monitor 14 (step S1 in FIG. 10 ). As shown, opposite ends 22 and 24 of rectangular sheet design 20 are provided with cut-away portions that interlock with each other, as will be made apparent from the discussion which follows.

In accordance with the present invention, a rectangular sheet 30 is cut from a larger sheet 32 so as to assume the size and dimensions of rectangular sheet design 20. See step S2 in FIG. 10. Larger sheet 32 can be made of any suitable material that is bendable and flexible, but has some resiliency. For example, larger sheet 32 can be made from a polyester or other plastic material. A suitable polyester film that can be used is a 1000 Type A polyester film sold by DuPont under the trademark MYLAR.

Figure 2:
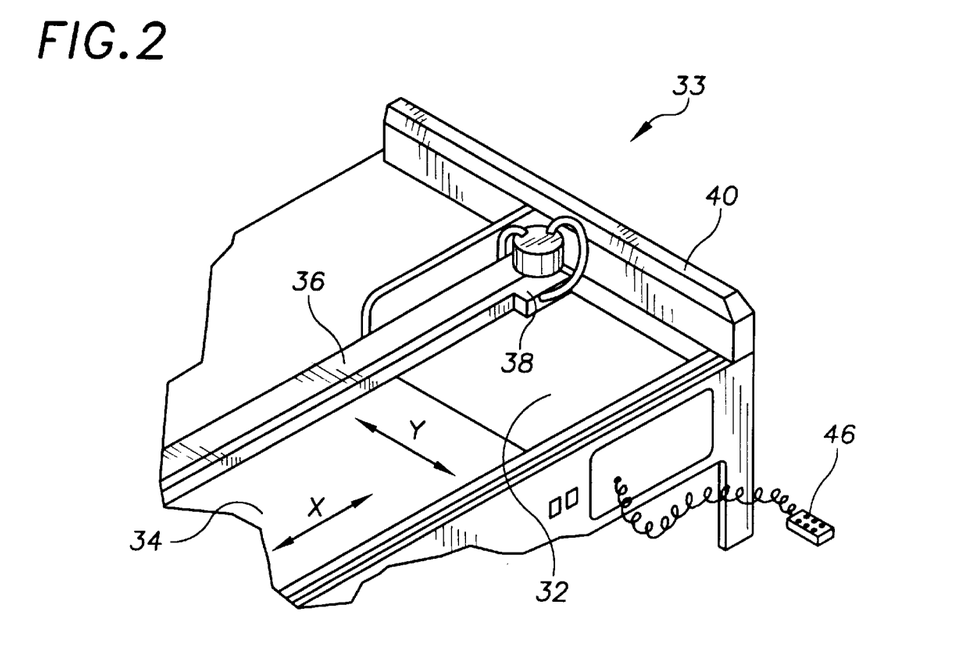
FIG. 2 is a perspective view of a laser cutting system for cutting a flexible sheet of material in accordance with the design and measurements on the computer system, and being controlled thereby.

The cutting operation can be accomplished in any known manner. For example, a conventional laser cutting system can be used. Specifically, as shown in FIG. 2, a CAD-CAM table 34 is provided on which the larger sheet 32 is positioned, and a laser cutting system 33 is mounted on table 34 for movement in the X and Y directions by means of a beam 36 movable in the Y direction along a fixed mounting 40 and a laser cutting device 38 movable in the X direction along beam 36. Movement of laser cutting device 38 is controlled by an operator through a control panel 46, and can be controlled by the computer system 10 to operate the same. A suitable laser cutting system 33 is sold under the trademark EUROLASER by RWH Industries, Inc. of Salem, Mass.

However, the present invention is not limited to such a laser cutting system, and any other suitable system can be used for cutting rectangular sheet 30, such as a punching operation or any other suitable device.

In accordance with an important aspect of the present invention, opposite edges 46 and 48 of rectangular sheet 30 are cut out in a complementary manner so as to interlock with each other when rectangular sheet 30 is formed into a cylinder, with opposite edges 46 and 48 adjacent and abutting each other. As shown in FIGS. 1–8, opposite edges 46 and 48 are cut away to form trapezoidal tabs 50 separated by oppositely oriented trapezoidal openings 52, such that trapezoidal tabs 50 of one edge 46 or 48 fit precisely within trapezoidal openings 52 in the other edge 48 or 46 in a dovetail manner.

It will be appreciated, however, that tabs 50 and openings 52 need not have a trapezoidal shape, but may have any other suitable shape. For example, tabs 50 and openings 52 may have a square, rectangular, circular or any other suitable shape.

Figure 3:
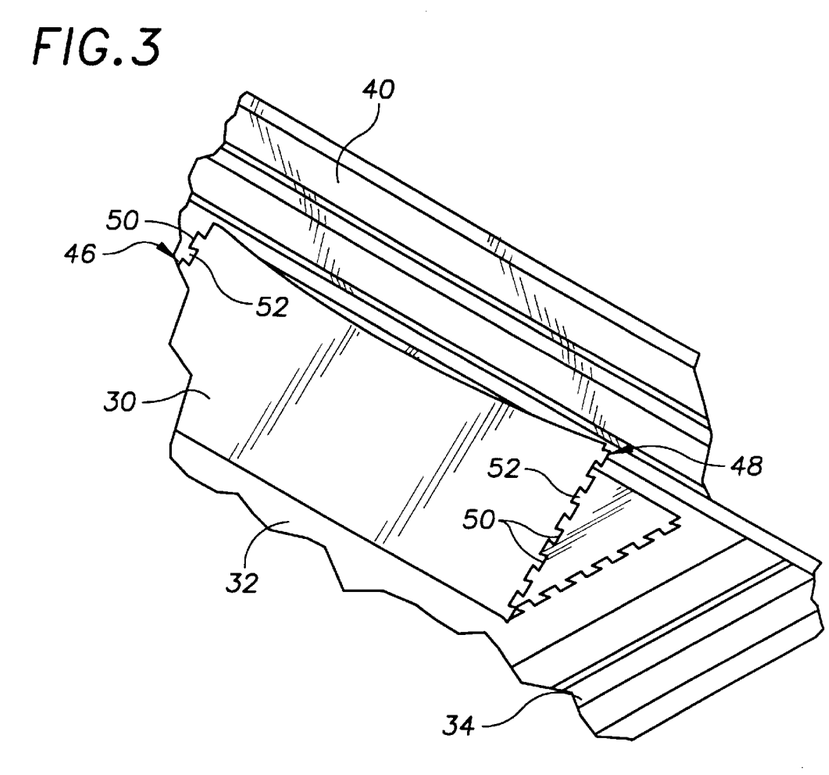
FIG. 3 is a perspective view of the cut rectangular sheet being removed from the larger sheet in the laser cutting system.
Figure 3A:
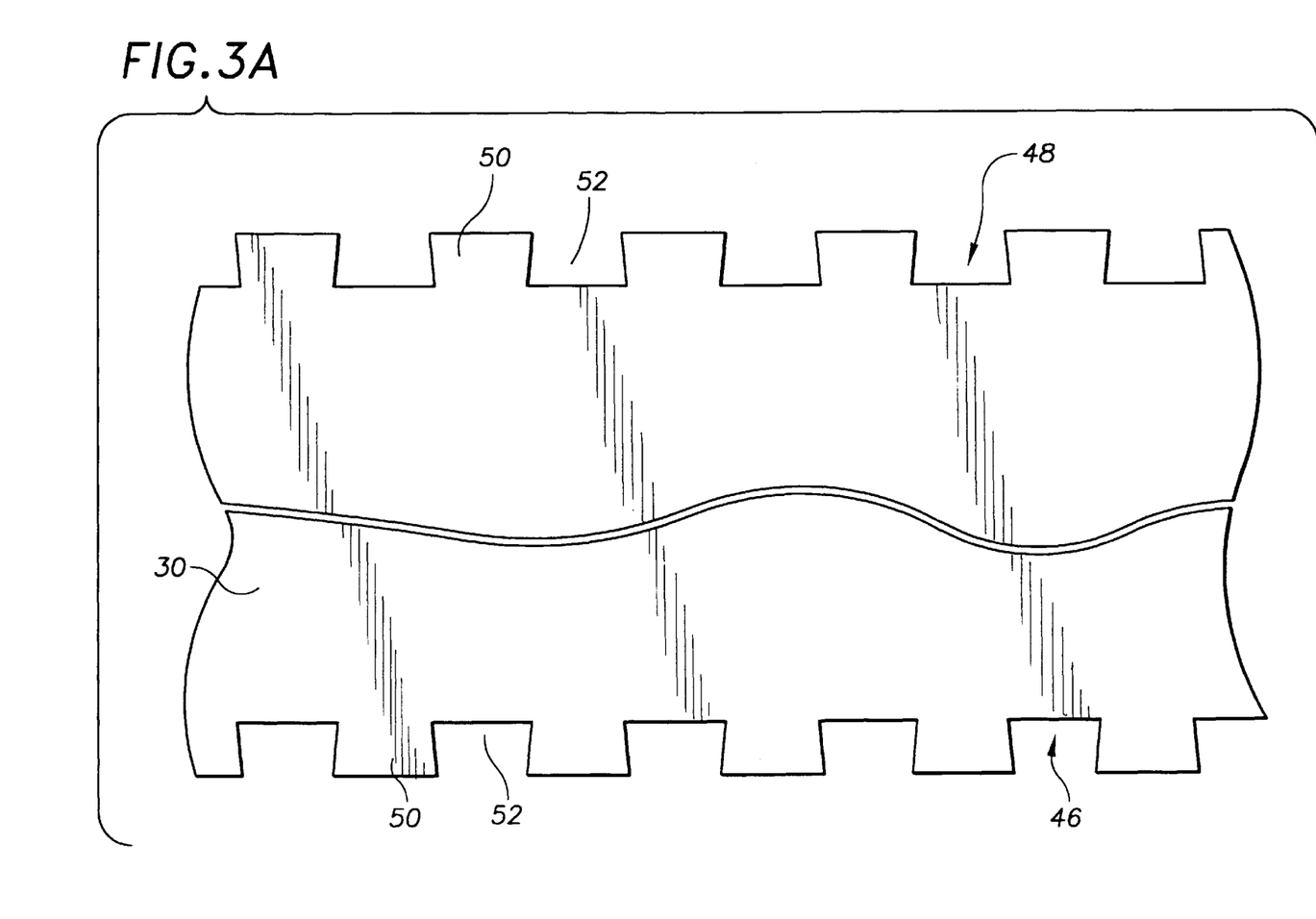
FIG. 3A is an enlarged top plan view of the cut rectangular sheet with the interlocking configuration.
Figure 4:
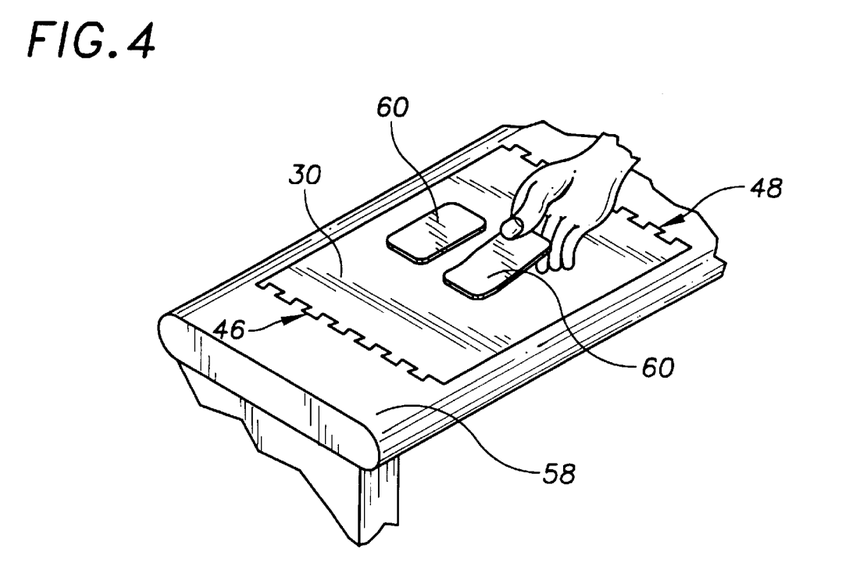
FIG. 4 is a perspective view of the cut rectangular sheet, with two printing plates being secured thereon.

FIG. 3 shows the cut rectangular sheet 30 being removed from larger sheet 32 in laser cutting system 33. See step S3 in FIG. 10. Thereafter, in accordance with step S4 in FIG. 10, and as shown in FIG. 4, the cut rectangular sheet 30 is placed flat on a table 58, and flexographic printing plates 60 are secured in aligned relation on one side of cut rectangular sheet 30. The securement can be in any suitable manner, but preferably, a permanent adhesive, as is conventional for such printing plates 60, is used.

It will be appreciated that this manner of securing printing plates 60 in the flat is greatly advantageous over the conventional method of adhering the printing plates on the formed cylindrical carrier sleeve, that is, mounting the printing plates in the round. With the present invention, it is much easier to mount printing plates 60 on cut rectangular sheet 30 while the latter is flat, and greater accuracy is achieved in mounting printing plates 60.

Further, by use of laser cutting assembly 33, the same assembly can be used to accurately mark the area for mounting printing plates 60, thereby providing accurate alignment of printing plates 60 on cut rectangular sheet 30.

Figure 5:
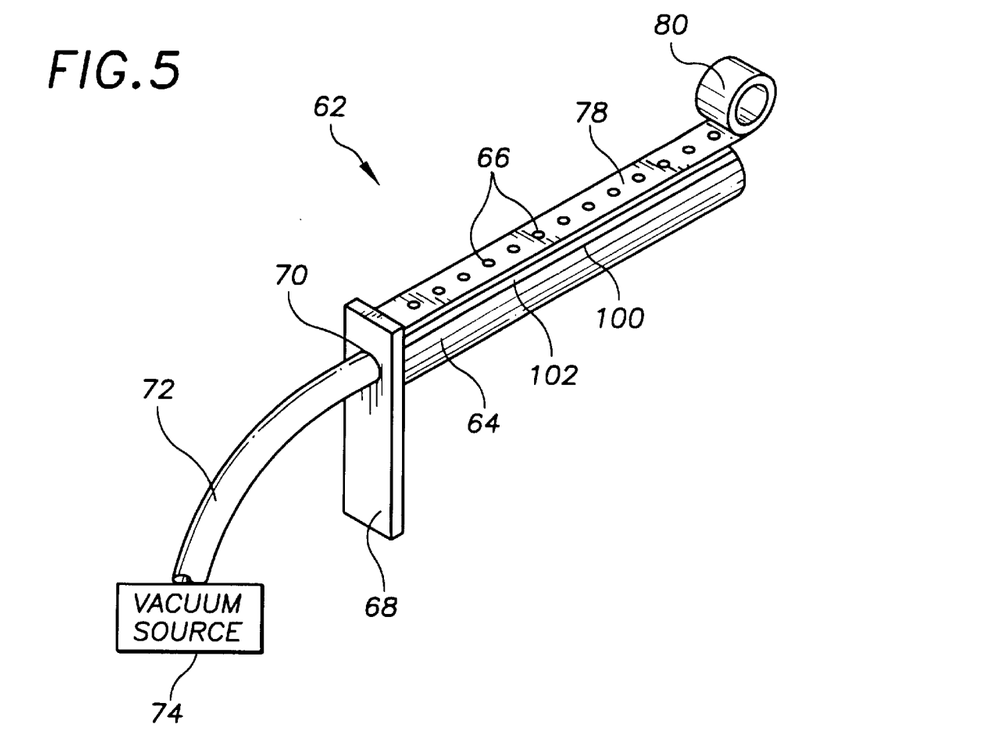
FIG. 5 is a perspective view of the tool assembly for forming the cut rectangular sheet into a cylindrical carrier sleeve.
Figure 6:
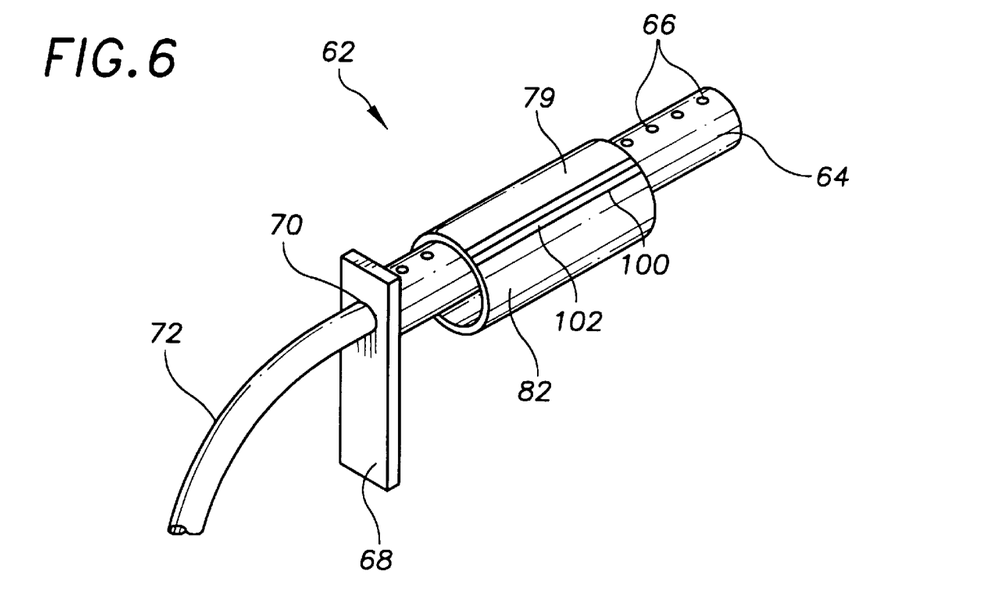
FIG. 6 is a perspective view of the tool assembly with the cylindrical carrier sleeve formed thereon.
Figure 12:
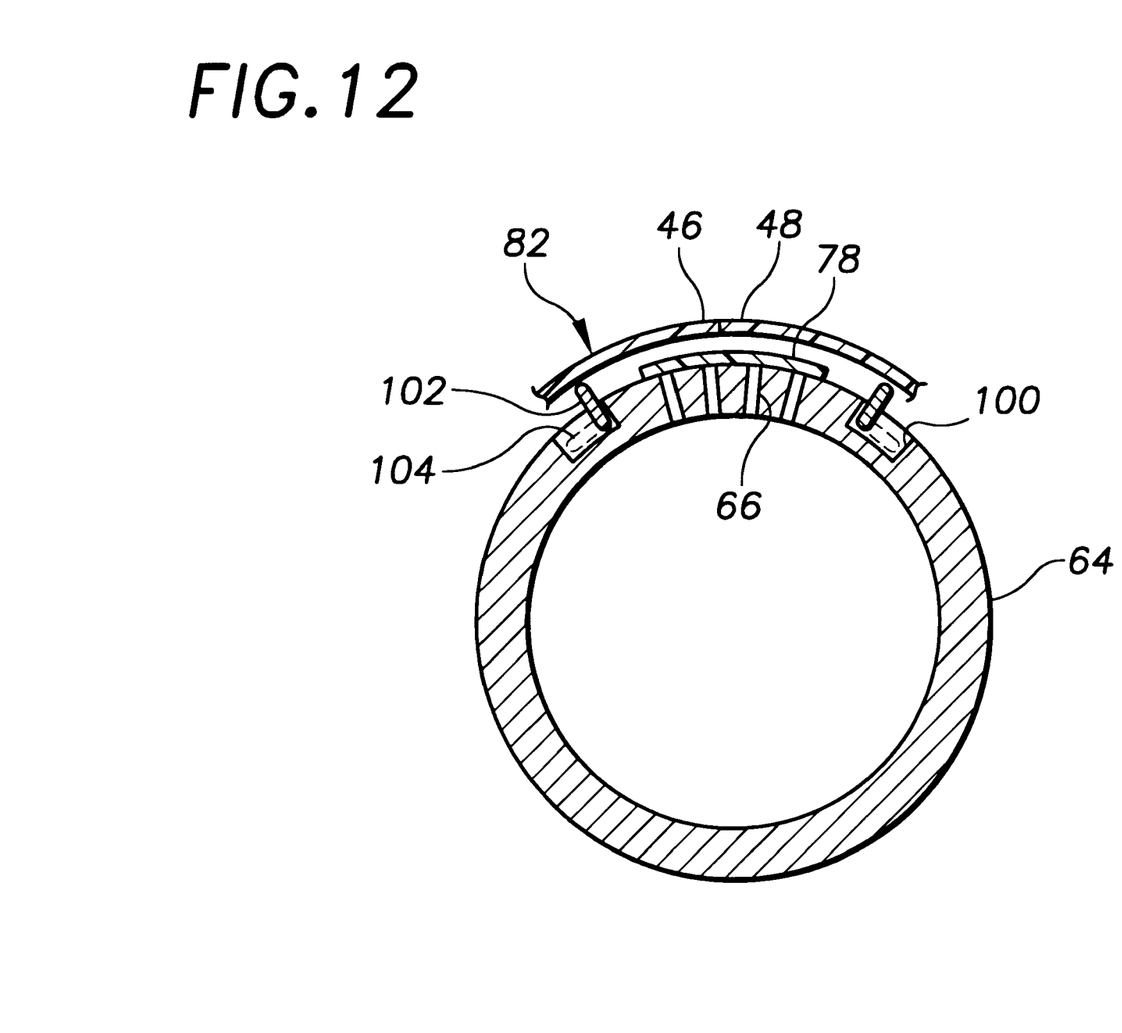
FIG. 12 is a cross-sectional view of the forming cylinder of FIGS. 5 and 6.

Referring now to FIG. 5, there is shown a forming jig 62 for forming cut rectangular sheet 30 into a cylindrical shape. Specifically, forming jig 62 includes a hollow forming cylinder 64 having a plurality of small holes 66 along an axial section thereof. Alternatively, and preferably, as shown in FIG. 12, a plurality of rows of such small holes 66 in the axial section can be provided. One end of cylinder 64 is secured to a first stand 68 in sealing arrangement therewith and held in a cantilever manner. As an alternative, the opposite end of cylinder 64 can be supported by a second stand (not shown) that is movable to permit a sleeve to be removed from cylinder 64. An opening 70 is provided in first stand 68 in open communication with the inside of cylinder 64, and a vacuum hose 72 is connected at one end with opening 70, and at the opposite end with a source of vacuum 74. The opposite end of cylinder 64 is closed off entirely.

In order to form rectangular sheet 30 into a cylindrical configuration, in accordance with a first method of the present invention, a piece of adhesive tape 78 from a roll of tape 80 is placed axially on the upper surface of cylinder 64 in covering relation to holes 66 and with the adhesive side facing up. Roll of tape 80 can be incorporated into one end of cylinder 64, if desired. Vacuum source 74 is then turned on, so as to hold tape 78 on cylinder 64, as shown in FIG. 5. This forms step S5 in FIG. 10.

Thereafter, edge 46 of cut rectangular sheet 30 is positioned on the upper adhesive side of tape 78 and thereby secured thereon. See step S6 in FIG. 10. Of course, it will be appreciated that printing plates 60 are positioned to the outside. Then, in step S7, the opposite edge 48 of cut rectangular sheet 30 is wrapped about forming cylinder 64 such that tabs 50 and openings 52 thereon intermesh and interlock with openings 52 and tabs 50, respectively, of the opposite edge 46. In such case, opposite edge 48 is also adhered to tape 78, to form cut rectangular sheet 30 into a cylindrical shape, and thereby create the formed carrier sleeve 82 with printing plates 60 thereon, as shown in FIG. 7.

Of course, any other suitable jig or other apparatus can be used for wrapping cut rectangular sheet 30 into a cylindrical configuration, within the scope of the present invention.

Figure 7:
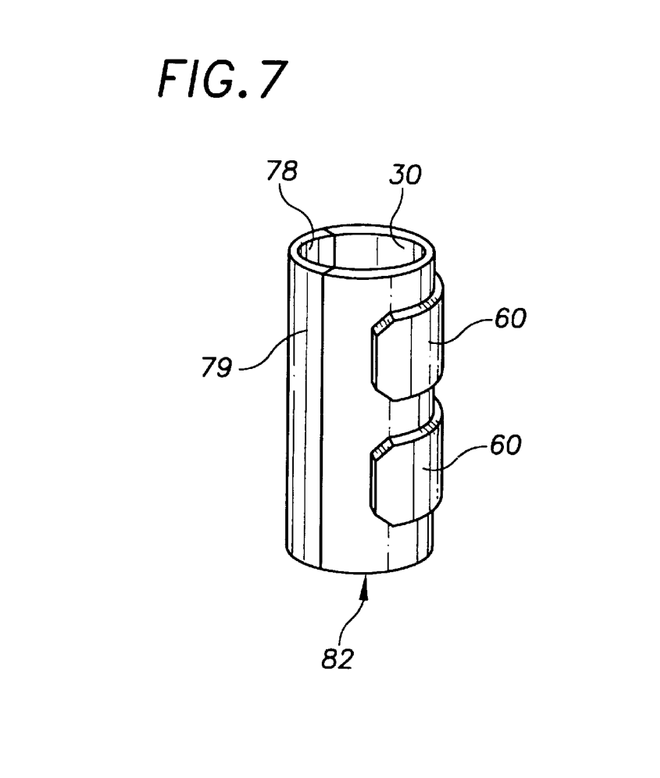
FIG. 7 is a perspective view of the formed carrier sleeve with the printing plates secured thereon.
Figure 8:
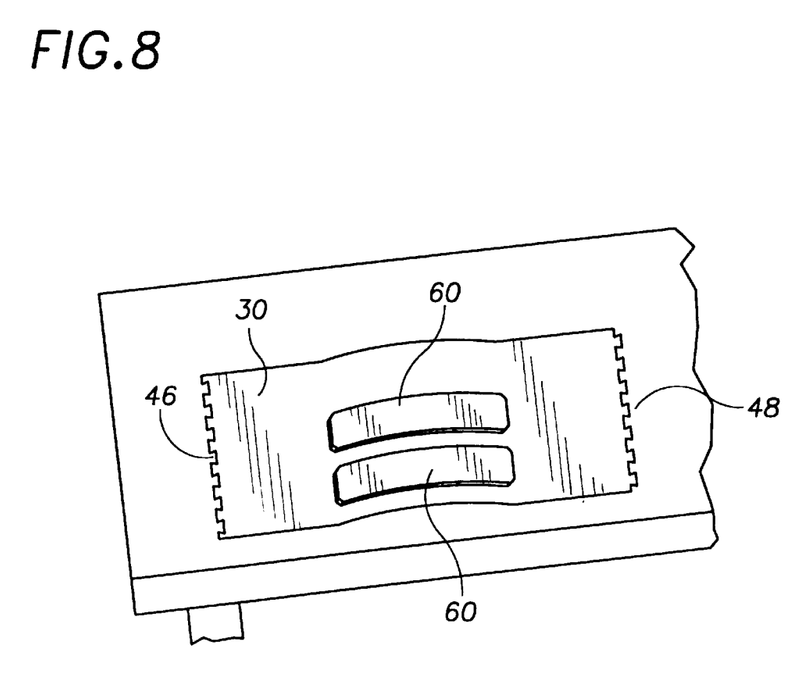
FIG. 8 is a perspective view of the formed carrier sleeve of FIG. 7 opened into a flat configuration.
Figure 9:
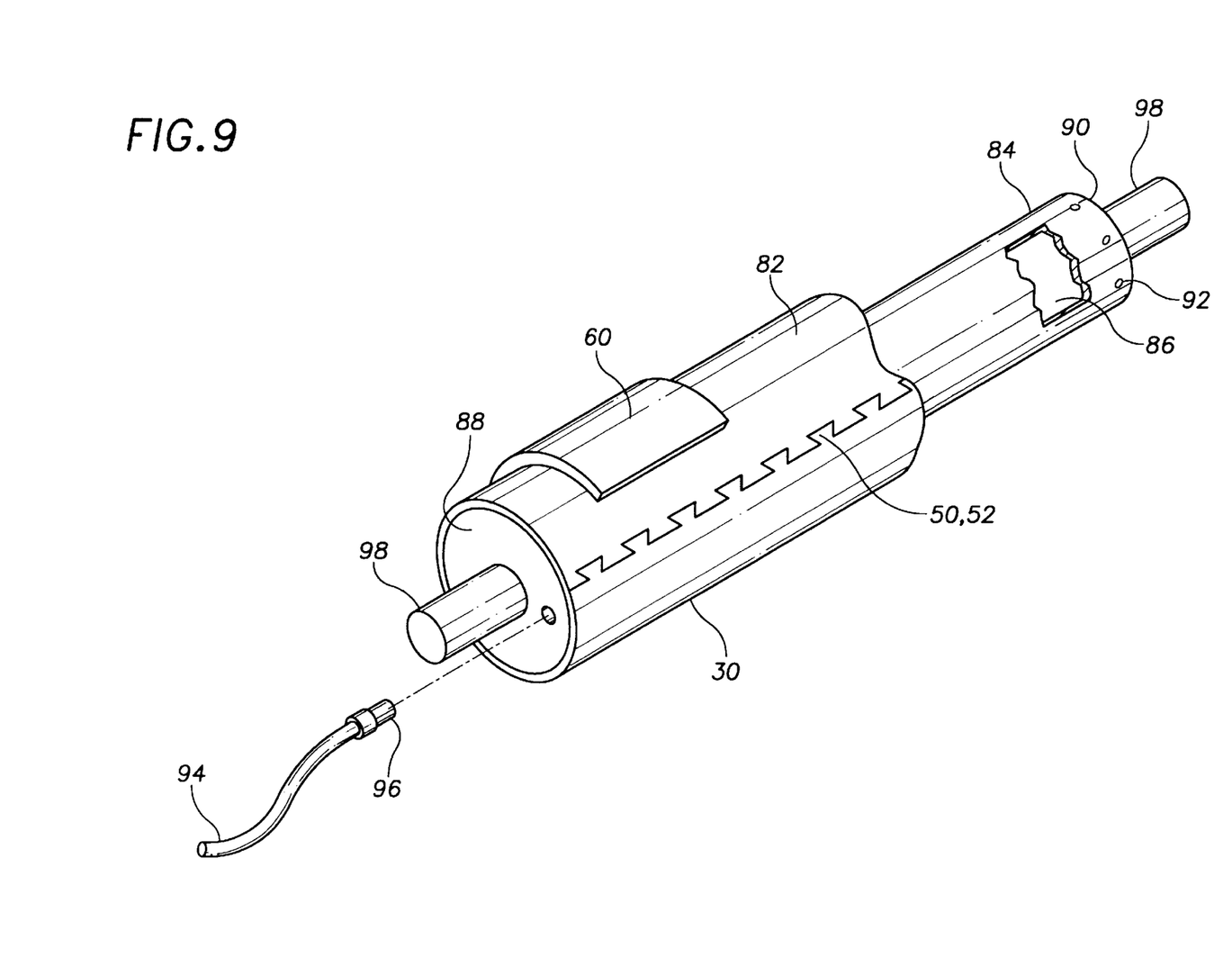
FIG. 9 is a perspective view showing the cut rectangular sheet of FIG. 3 formed into a carrier sleeve with printing plates thereon, and mounted on a printing cylinder.

If desired, an adhesive tape 79 can be wrapped about the outside of the formed carrier sleeve 82 as well, as shown in FIG. 7, although this is not necessary. The application of adhesive tape 78 to the inside of carrier sleeve 82, however, is important. This is because carrier sleeve 82 is placed on a mandrel or printing cylinder 84, as shown in FIG. 9, by applying air pressure to the inside of carrier sleeve 82 and expanding it. Because of the material used in carrier sleeve 82, it is slightly expandable when such air pressure is applied. As a result, the air pressure does not affect the seal from tape 78, but rather, enhances the seal, since it presses tape 78 tightly against the interlocked edges 46 and 48.

It will be appreciated that it is unnecessary to provide cylinder 64 with the same diameter as carrier sleeve 82 to be formed. This is evident from FIG. 6. The carrier sleeve 82 that is formed is preferably formed in a cylindrical configuration, regardless of the diameter thereof.

After formation of carrier sleeve 82, vacuum source 74 is turned off, and carrier sleeve 82 is removed, as shown in FIG. 7, ready for use in a printing operation. See step S8 in FIG. 10.

As a modification, printing plates 60 can be adhered after carrier sleeve 82 is formed in step S8. In such case, step S4 would be eliminated, and in place thereof, step S9 would be provided.

As shown in FIG. 9, carrier sleeve 82 having printing plates 60 thereon, is removably mounted on a hollow printing cylinder 84 having an inner chamber 86 which is used as a compressed air chamber. Cylinder 84 has air-tight end plates 88 and 90 thereon, along with spaced apart radially extending apertures 92 through which air from chamber 86 passes for expanding carrier sleeve 82 during mounting and dismounting operations, as is conventional. Air is introduced into chamber 86 through air hose 94, and a coupling element 96 is disposed within end plate 88 and provides means for connecting air hose 94 to cylinder 84 for introducing compressed air to cylinder chamber 86. Trunnions 98 are provided for rotationally supporting cylinder 84.

Thus, it is only necessary to provide the forced air in order to expand carrier sleeve 82 slightly, whereby carrier sleeve 82 can be slid onto printing cylinder 84. When the compressed air is stopped, carrier sleeve 82 retracts and frictionally engages the outer surface of printing cylinder 84.

After a printing operation has been completed, the compressed air is once again supplied to printing cylinder 84 in order to remove carrier sleeve 82 therefrom. Then, carrier sleeve 82 can be stored in its cylindrical configuration. Alternatively, and preferably, however, tape 78 and 79 can be removed, so that carrier sleeve 82 with printing plates 60 thereon, can be stored in the flattened state shown in FIG. 8.

Thus, carrier sleeve 82 can be taken apart with printing plates 60 still on carrier sleeve 82. Carrier sleeve 82 can then be stored in the flat or hung position. When reassembled to a cylindrical carrier sleeve 82, as described above, printing plates 60 remain in the correct position. The uniquely configured cut-away edges allow disassembly and assembly of carrier sleeve 82 while keeping the register position of printing plates 60. This unique method of manufacturing locks the edges together temporarily or permanently, if desired.

Figure 11:
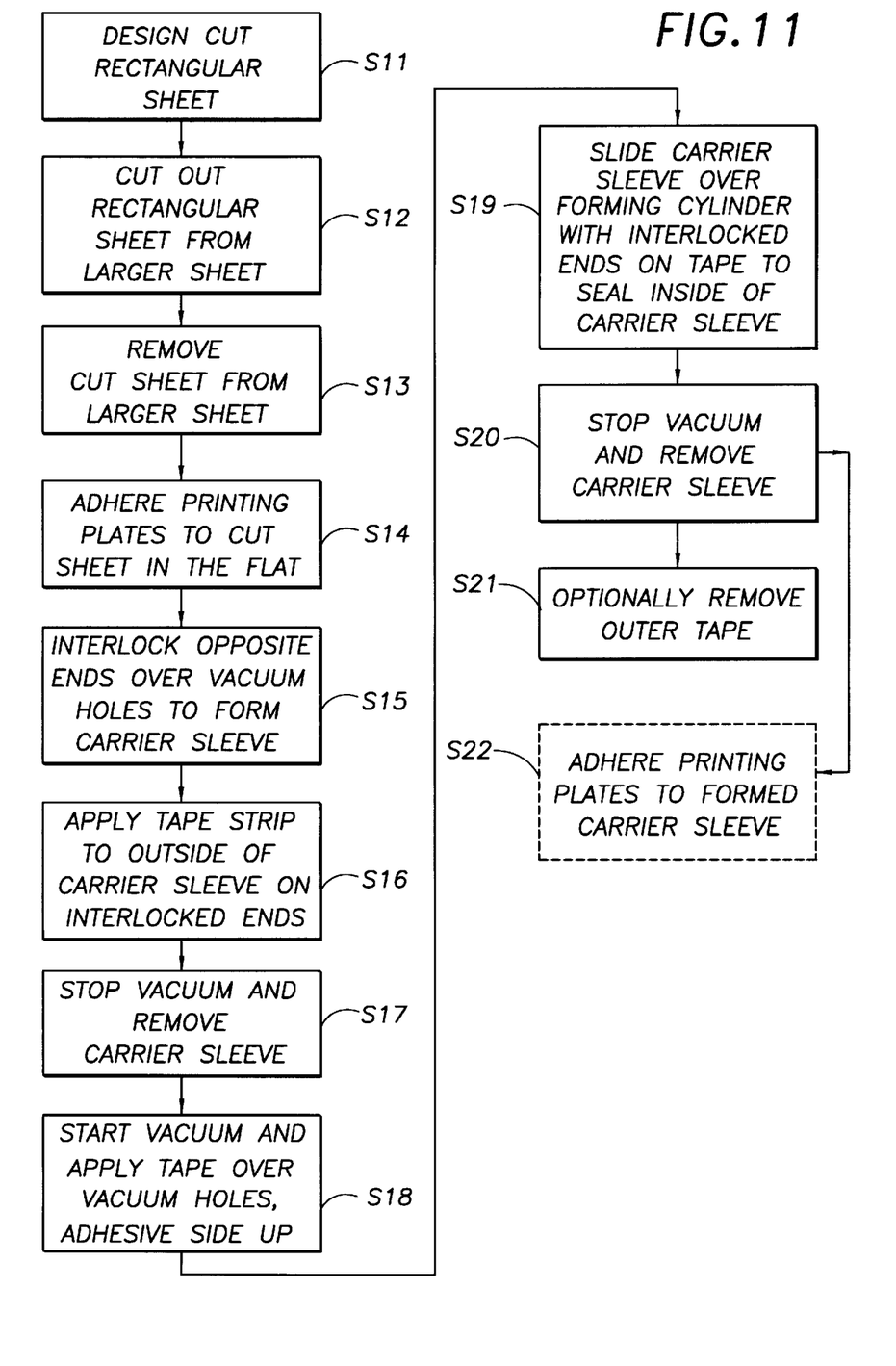
FIG. 11 is a flow chart diagram of another method of forming the carrier sleeve of the present invention.

Referring now to FIG. 11, there is shown an alternative and preferred method of forming carrier sleeve 82 according to another embodiment of the present invention.

According to FIG. 11, steps S11–S14 are identical to steps S1–S4 of the method of FIG. 10. According to step S15, however, opposite edges 46 and 48 of rectangular sheet 30 are interlocked on forming cylinder 64 without the use of tape 78. Rather, edge 46 is placed on forming cylinder 64 such that edge 46 is held in place by the vacuum through holes 66. Then, the opposite edge 48 is wrapped about cylinder 64 and interlocked with edge 46, that is, so that tabs 50 and openings 52 of edge 46 interlock with openings 52 and tabs 50, respectively, of edge 48. In such position, both edges 46 and 48 are held down by the vacuum and maintained in the interlocked position. Thereafter, an outer piece of adhesive tape 79 is placed over the outer surface of interlocked edges 46 and 48 to maintain edges 46 and 48 in interlocked position, in accordance with step S16. As a result, rectangular sheet 30 is formed into a cylindrical carrier sleeve. Of course, any other suitable seal of edges 46 and 48 can be provided, such as an ultrasonic seal or the like.

The vacuum is then stopped so that the formed carrier sleeve can be removed (step S17). Then, an inner piece of adhesive tape 78 from a roll of tape 80 is placed axially on the upper surface of cylinder 64 in covering relation to holes 66 and with the adhesive side facing up (step S18). Vacuum source 74 is then turned on, so as to hold tape 78 on cylinder 64, as shown in FIG. 5. The formed carrier sleeve is then slid over forming cylinder 64 such that the interlocked edges 46 and 48 are positioned on tape 78 in order to seal the inside of the carrier sleeve. As discussed above, the application of adhesive tape 78 to the inside of the carrier sleeve is important. This is because the carrier sleeve is placed on a mandrel or printing cylinder, as shown in FIG. 9, by applying air pressure to the inside of carrier sleeve 82 and expanding it. Because of the material used in the carrier sleeve, it is slightly expandable when such air pressure is applied. As a result, the air pressure does not affect the seal from tape 78.

In this manner, there is an adhesive tape 78 applied to the inside of the interlocked edges, and an adhesive tape 79 applied to the outside of the interlocked edges.

Then, the vacuum is stopped, and the formed carrier sleeve 82 is removed (step S20). Since the inner adhesive tape 78 is the important tape, the outer piece of adhesive tape 79 can be removed, if desired (step S21).

As a modification, printing plates 60 can be adhered after carrier sleeve 82 is formed in step S20. In such case, step S4 would be eliminated, and in place thereof, step S22 would be provided.

In the method of FIG. 11, it is desirable to prevent the occurrence where only a portion of the carrier sleeve formed in step S17 prematurely adheres to the tape 78 in step S19 when reinserting the carrier sleeve over the forming cylinder 64. Therefore, in accordance with another aspect of the present invention, forming cylinder 64 is provided with two lengthwise extending channels 100 extending on opposite sides of the rows of small holes 66. An elongated finger 102 is pivotally mounted on a piano-type hinge 104 in each channel 100 so as to be movable between the dashed line lowered position of FIG. 12, within the outer perimeter of forming cylinder 64, and the solid line raised position of FIG. 12, such that the free ends thereof are positioned outwardly of forming cylinder 64. The pivoting relation on piano-type hinge 104 can be of a friction type, so that fingers 102 remain in whichever position to which they are moved.

With this arrangement, fingers 102 are moved to the raised position prior to step S19. Then, the carrier sleeve that is moved thereon is held by fingers 102 in spaced relation to forming cylinder 64 and tape 78. When the carrier sleeve is fully inserted over forming cylinder 64 to the desired position, fingers 102 are pivoted to their lowered, dashed line positions, so that the interlocked edges 46 and 48 of carrier sleeve 82 can be moved into position on tape 78.

Of course, any other arrangement can be provided for spacing the carrier sleeve from cylinder 64. For example, fingers 102 can be provided so as to be always radially oriented, and so as to be slidable in and out of cylinder 64.

It will therefore be appreciated that, with the present invention, a carrier sleeve 82 for holding printing plates 60 can be easily and readily formed, without a time consuming and expensive operation, as is the case with carrier sleeves formed from helically wound tapes.

Further, carrier sleeve 82 is made of a single layer, thereby overcoming the problem of de-lamination in the prior art, and is provided with a single seam, thereby avoiding the problem of degradation of high grade printing. Also, carrier sleeve 82 does not require different tooling for different lengths or diameters of carrier sleeves.

It will be appreciated that various changes can be made to the invention within the scope thereof. Thus, while it is preferable to form opposing edges 46 and 48 with interlocking tabs 50 and openings 52, opposing edges 46 and 48 can be formed as straight lines without such tabs 50 and openings 52.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A printing carrier sleeve for mounting at least one printing plate thereon, said printing carrier sleeve comprising a sheet of flexible material having opposite edges, with said opposite edges being provided in at least substantially abutting arrangement with each other so as to form a cylinder having an outer surface for holding at least one printing plate thereon, said opposite edges being cut-away to provide complementary tabs and openings that interlock with each other, and said opposite edges being secured together by said complementary tabs and openings that interlock with each other.

2. A printing carrier sleeve according to claim 1, wherein said flexible material is a polyester material.

3. A printing carrier sleeve according to claim 1, wherein said complementary tabs and openings each have a substantially trapezoidal shape.

4. A printing carrier sleeve according to claim 1, further comprising a first piece of tape for securing together said opposite edges, said first piece of tape being secured to an inner surface of said printing carrier sleeve.

5. A printing carrier sleeve according to claim 4, further comprising a second piece of tape for securing together said opposite edges, said second piece of tape being secured to said outer surface of said printing carrier sleeve.

6. A method of forming a printing carrier sleeve for mounting at least one printing plate thereon, said method comprising the steps of:
 a) cutting a sheet of flexible plastic material having opposite edges into a substantially rectangular shape of desired dimensions,
 b) securing opposite edges of said sheet together in at least substantially abutting relation to form said printing carrier sleeve in a cylindrical configuration, said step of securing opposite edges of said sheet together in at least substantially abutting relation including the steps of:
  securing one edge of said cut sheet on a forming cylinder, by applying a vacuum through openings in said forming cylinder to hold said one edge on said forming cylinder,
  wrapping the opposite edge of said sheet about said forming cylinder into at least substantially abutting relation with said one edge, by securing the opposite edge in said at least substantially abutting relation with said one edge such that said opposite edge is held on said forming cylinder by said vacuum applied through said holes, and
  securing said one edge and said opposite edge together to form said printing carrier sleeve, by placing a strip of tape on an outer surface of said abutted edges, and
 c) mounting at least one printing plate on said sheet, one of:
  i) prior to said step of securing opposite edges when said sheet is in a substantially flat condition, and
  ii) after said step of securing opposite edges when said sheet is in said cylindrical configuration.

7. A method according to claim 6, wherein said step of cutting includes the step of cutting said sheet from a larger sheet by a laser cutting device.

8. A method according to claim 6, wherein said step of cutting includes the step of cutting said sheet from a larger sheet by a punching operation.

9. A method according to claim 6, wherein said step of mounting includes the step of adhering said at least one printing plate on said sheet.

10. A method according to claim 6, wherein said step of securing opposite edges of said sheet together in abutting relation further includes the steps of:
 removing the formed printing carrier sleeve from said forming cylinder,
 removably securing a further strip of tape on said forming cylinder with a vacuum, with an adhesive side facing up,
 positioning said formed printing carrier sleeve over said forming cylinder and in spaced relation to an outer surface of said forming cylinder,
 placing said abutting edges of said formed carier sleeve onto said further strip of tape, and
 removing said formed carrier sleeve with tape on an inside and outside thereof.

11. A method of forming a printing carrier sleeve for mounting at least one printing plate thereon, said method comprising the steps of:
 a) cutting a sheet of flexible plastic material having opposite edges into a substantially rectangular shape of desired dimensions,
 b) securing opposite edges of said sheet together in at least substantially abutting relation to form said printing carrier sleeve in a substantially cylindrical configuration, said step of securing opposite edges of said sheet together in said at least substantially abutting relation including the steps of:
  placing a strip of tape on a forming cylinder by removably securing said strip of tape on said forming cylinder with a vacuum,
  securing one edge of said cut sheet on said forming cylinder, by securing said one edge on said strip of tape on said forming cylinder, and
  wrapping the opposite edge of said sheet about said forming cylinder into said at least substantially abutting relation with said one edge, including the step of securing the opposite edge on said strip of tape in said at least substantially abutting relation, and
  securing said one edge and said opposite edge together by said tape, to form said printing carrier sleeve,
 c) mounting at least one printing plate on said sheet, one of:
  i) prior to said step of securing opposite edges, when said sheet is in a substantially flat condition, and
  ii) after said step of securing opposite edges, when said sheet is in said substantially cylindrical configuration.

12. A method according to claim 11, wherein said step of cutting includes the step of cutting said sheet from a larger sheet by a laser cutting device.

13. A method according to claim 11, wherein said step of cutting includes the step of cutting said sheet from a larger sheet by a punching operation.

14. A method according to claim 11, wherein said step of mounting includes the step of adhering said at least one printing plate on said sheet.

15. A method of forming a printing carrier sleeve for mounting at least one printing plate thereon, said method comprising the steps of:
 a) cutting a sheet of flexible plastic material having opposite edges into a substantially rectangular shape of desired dimensions, said step of cutting including the step of cutting away said opposite edges of said sheet to provide complementary tabs and openings that can interlock with each other;
 b) securing opposite edges of said sheet together in at least substantially abutting relation to form said printing carrier sleeve in a substantially cylindrical configuration, said step of securing said opposite edges of said sheet together including the step of interlocking said tabs and openings of said opposite edges; and
 c) mounting at least one printing plate on said sheet, one of:
  i) prior to said step of securing when said sheet is in a substantially flat condition, and
  ii) after said step of securing when said sheet is in said substantially cylindrical configuration.

16. A method according to claim 15, wherein said step of securing opposite edges of said sheet together in abutting relation includes the steps of:
 securing one edge of said cut sheet on a forming cylinder,
 wrapping the opposite edge of said sheet about said forming cylinder into abutting relation with said one edge, and
 securing said one edge and said opposite edge together to form said printing carrier sleeve.

17. A method according to claim 16, wherein:
 said step of securing said one edge and said opposite edge together includes the step of placing a strip of tape on said forming cylinder prior to said step of securing said one edge, said step of securing said one edge secures said one edge on said strip of tape on said forming cylinder, and said step of wrapping the opposite edge of said sheet about said forming cylinder into abutting relation with said one edge includes the step of securing the opposite edge on said strip of tape in said abutting relation.

18. A method according to claim 15, wherein said step of cutting includes the step of cutting said sheet from a larger sheet by a laser cutting device.

19. A method according to claim 15, wherein said step of cutting includes the step of cutting said sheet from a larger sheet by a punching operation.

20. A method according to claim 15, wherein said step of mounting includes the step of adhering said at least one printing plate on said sheet.

* * * * *